United States Patent [19] [11] 4,268,851
Heller et al. [45] May 19, 1981

[54] SIGNAL GENERATOR

[75] Inventors: Arthur Heller, Eichenried; Alfred Schaumberger, Olching; Klaus Schuster, Landshut; Friedrich Dollinger, Munich, all of Fed. Rep. of Germany

[73] Assignee: U.S. Philips Corporation, New York, N.Y.

[21] Appl. No.: 38,364

[22] Filed: May 11, 1979

[30] Foreign Application Priority Data

May 12, 1978 [DE] Fed. Rep. of Germany ....... 2821024

[51] Int. Cl.³ .......................... H04N 9/62; H04N 7/02
[52] U.S. Cl. ...................................... 358/10; 358/139
[58] Field of Search ...................... 358/10, 21 V, 139; 328/187; 365/94; 364/514, 515; 324/77 G, 76 R, 77 R, 77 A, 79 D

[56] References Cited

U.S. PATENT DOCUMENTS 4,089,026  5/1978  Wilhelm et al. ...................... 358/10

OTHER PUBLICATIONS

Lang et al., "Testing Color Reproduction by Means of a Programmable Color Bar Generator", SMPTE Journal, vol. 87, Sep. 1978, pp. 579–582.
Naitoh et al., "Digital VIT Signal Generator", J. Inst. TV Engrs. of Japan, vol. 30, No. 2 (1976), pp. 114–120.

Primary Examiner—John C. Martin
Attorney, Agent, or Firm—Thomas A. Briody; William J. Streeter; Edward W. Goodman

[57] ABSTRACT

A television test line signal generator comprising a read-only memory which is read under the control of a clocked counting circuit, memory outputs being connected via a clocked buffer store to a digital-to-analogue converter, which is followed by a signal filter. The information in the read-only memory is programmed versus signal distortions following thereafter.

6 Claims, 7 Drawing Figures

SIGNAL GENERATOR

BACKGROUND OF THE INVENTION

The invention relates to a signal generator for synthesizing television test line signal variations having a relatively high frequency and being composed of individual portions.

Signals having a relatively high frequency, particularly television test line signals which are coupled to a reference signal having a low frequency have been generated so far by means of conventional analogue techniques. The difficulty encountered herewith, particularly for television test line signals, is that they are partly composed of a large number of different signal components (FIGS. 6a and 6b). Generating these test line signals by means of the analogue technique, primary signals having a defined rise time are, for example, generated first and brought by means of very expensive and complicated band limiting filters to the required definite variation (white pulse, 2T-pulse, 20T-LF-component). In addition, special analogue signal generators, such as staircase voltage generators are required. Finally, modulators and analogue adding circuits are required to generate the 20T-colour carrier component and to superimpose this component on the LF-component or to obtain a staircase signal having a carrier. Finally, all these signal components which are individually generated must be combined in a selection and combination circuit into the prescribed definite test line signal. In addition, it is required that each signal component generator out of a large plurality of signal component generators must be synchronized by a reference signal having a low frequency (in this case the television synchronizing signal) so that the relevant generator does not only have an extreme amplitude stability in spite of a phase which is, each time, different with respect to the reference signal, but also an excellent time stability, in order to perform its function as test line generator.

The type of signal generator described above and corresponding to the prior art is expensive and complicated, particularly owing to peripheral conditions which form an extra difficulty; besides that the equipment is rather bulky.

SUMMARY OF THE INVENTION

It is an object of the invention to provide a signal generator of the above-mentioned type which can be produced relatively easily and with simple, cheap elements.

According to the invention this object is accomplished in a generator characterized in that there are provided;

(a) a combination, which is known per se, of a digital read-only memory, comprising at the address side a counting circuit which is operated by a clock signal generator and comprising at the output side a digital-to-analogue converter, a filter having been arranged behind the converter, the phase of the clock signal generator and of the counting circuit being synchronized by a television synchronizing signal;

(b) a digital buffer store provided between the digital read-only memory and the digital-to-analogue converter to a clock input of which a signal derived from the counting circuit is applied; and in that:

(c) the digital read-only memory is programmed with a sequency of information words so that distortion on the basis of the transfer properties of the digital-to-analogue converter and of the filter provided behind the converter, respectively, are compensated for.

For the generation of a signal having a relatively low frequency, it is known per se (Elektronik 1975, number 2, page 70) to perform a signal synthesis by means of a digital-to-analogue converter from information received from a read-only memory. However, this procedure cannot be used without further measure for the generation of signals having a relatively high frequency, to prevent this procedure from becoming equally expensive as the known procedures of the analogue technique. The drawback is that for high-frequency application, firstly the access time of read-only memories, which is already in the order of magnitude of the synthesis clock period, deviates so highly depending on the address that an ideal digital-to-analogue converter arranged therebehind would generate a signal shape which would be distorted due to the distorted time variation. Secondly, digital-to-analogue converters which are suitable for high-frequency application are expensive, complicated and bulky. Finally, a synthesis frequency must be chosen, for technological reasons, which is relatively close to the highest prevailing frequency of the signal to be generated. The result is that the filter which must be arranged behind the digital-to-analogue converter must separate, for an interference-free operation, the useful signal and noise components which are very close to it (synthesis frequency) causing the filter to be complicated and expensive.

The solution according to the invention is based on the following considerations: to avoid different access times of read-only memories and, consequently, faulty readings and distortions of the time variation, a buffer store which enables a constant time base and a reliable reading of the information is provided before the digital-to-analogue converter. To enable the use of simple digital-to-analogue converters, which produce transmission errors, as well the use of simple filters having a considerable attenuation at the end of the pass-band, the read-only memory is programmed so that the sum of all these faults is compensated into the opposite direction, resulting in that the output signal is free from errors in spite of these simple, cheap and smaller components.

DESCRIPTION OF THE DRAWINGS

The invention will now be further explained with reference to the drawings. Herein.

DESCRIPTION OF THE PREFERRED EMBODIMENTS

Figure 1:
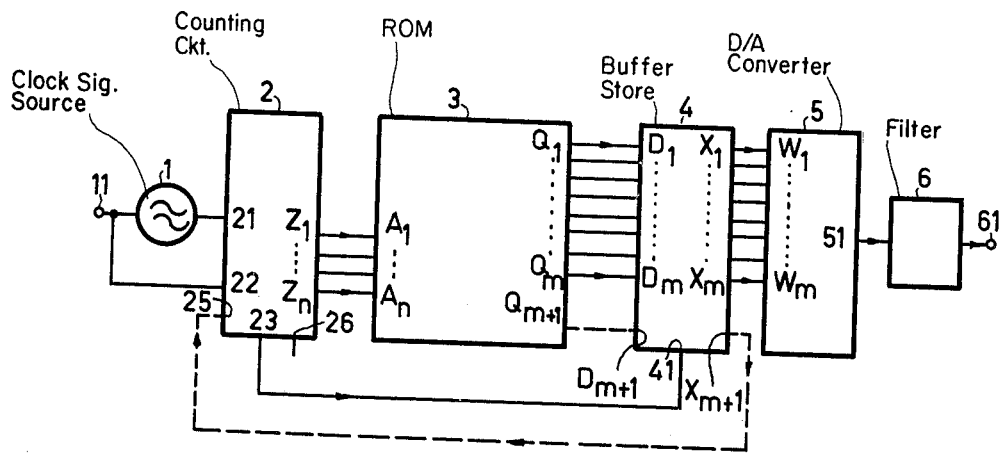
FIG. 1 shows a generally block diagram of a signal generator according to the invention.
Figure 4:
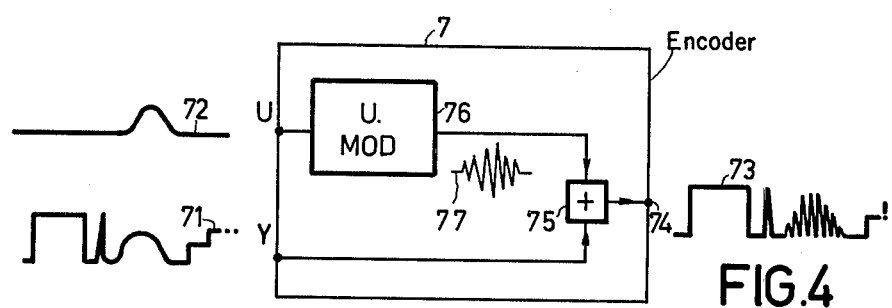
FIG. 4 shows a block diagram of a modified television signal color encoder which can be controlled by a signal generator according to the invention for the additional generation and mixing of test line signals.
Figure 6A:
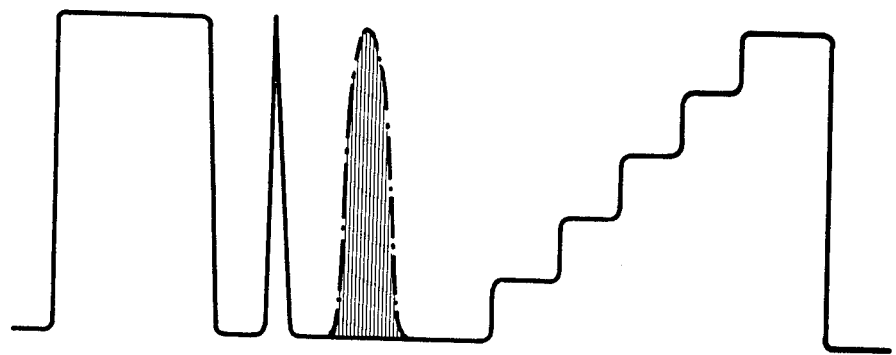
Figure 6B:
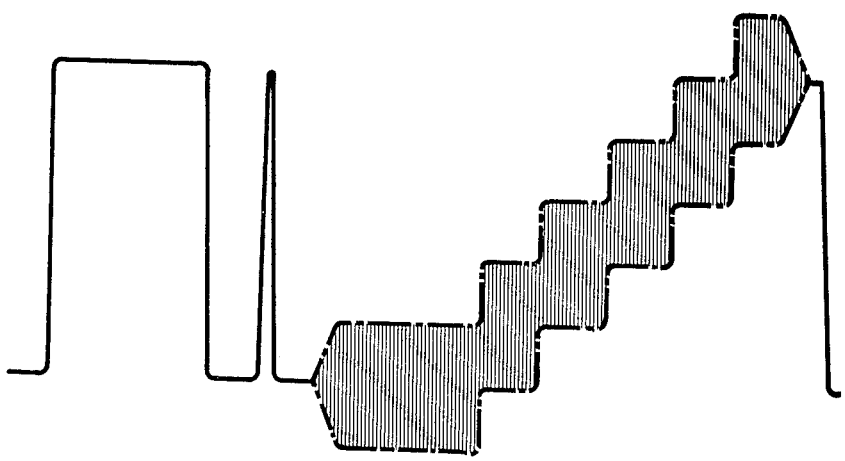

The block diagram shown in FIG. 1 comprises a clock signal source 1 which, via a counting circuit 2, addresses a digital read-only memory (ROM) 3 the information of which, appearing at outputs $Q_1$ to $Q_m$ is applied to a digital-to-analogue converter 5 via a buffer store 4 for compensating for address-dependent different access times. The analogue signal output 51 of the digital-to-analogue converter 5 supplies a synthesized television test line signal at an output 61 via an output filter 6, for example as shown in FIGS. 6a and 6b or—as will be further explained hereinafter—a video test signal component for connection to a color encoder as shown in FIG. 4, which generates the desired test line signal from several components.

The phase of the clock signal source 1, the frequency of which preferably corresponds to the fourfold color carrier frequency, must be synchronized by a television synchronizing signal 11, and it must, for example, operate in the start-stop mode. Herein, the television synchronizing signal 11 must in particular be understood to mean also one single signal of the duration of one line, which represents an in-phase portion of the overall television synchronizing signal for the duration of the desired test line position. In this case the clock signal source 1 does not generate the output signal in all lines but only in the line comprising the test signal. A quartz oscillator having the $2^x$-fold color carrier frequency is preferably used as the clock signal source 1, a binary divider having x stages which is reset to zero at the beginning of the line by the television synchronizing signal 11 being provided in this oscillator, so that when x (x being an integer) is sufficiently large, only a negligible phase jitter effect remains.

The counting circuit 2 is constructed as a binary counter which is resettable to zero and which is clocked via a terminal 22 by the horizontal synchronizing signal 11 and by the leading edge thereof, respectively. In response thereto the phase of reading the memory 3 is substantially synchronized with the television clock, whereas the phase line synchronization is effected by means of the output signal of the clock signal source 1. The counting circuit outputs Z1 to Zn are connected to the address inputs A1 to An of the memory 3.

As known, the variation in the access time of a digital read-only memory 3 is so highly dependent on the address that this variation is close to the order of magnitude of the synthesis clock periods, and of the clock signal period duration, in high-frequency applications. For this reasons the information outputs Q1 to Qm are connected to information inputs D1 to Dm of the buffer store 4, it being assumed that the store 3 has a length of $2^n$ words and a width of m bits per word. At a terminal 23, the counting circuit 2 supplies a transfer clock pulse for a clock input 41 of the buffer store 4, in such a time position that after each change in address, all the associated output information of the store 3 is available and can be switched-on absolutely simultaneously to the outputs x1 to xm of the buffer store 4. Here they remain constant, until the occurrence of the next transfer clock pulse at the clock input 41 etc. Inputs W1 to Wm of the digital-to-analogue converter 5 are supplied in this manner with input information having a perfectly uniform and, for each of the m bits, identical time base.

For reasons of price and volume, the use of simple and, consequently, also faulty and relatively slow digital-to-analogue converters 5 as well as simple output filters 6, for example RC-filters, is desirable. However, such simple components produce signal distortions in the useful video range, particularly non-steep edges and a dip at the end of the high-frequency video range. In order to enable the use of such components for the signal generator according to the invention, the information words in the memory 3 are statically and dynamically programmed in such a "pre-distorted" way that the sum of the errors of the converter 5 and of the filter 6 are compensated for.

Figure 2:
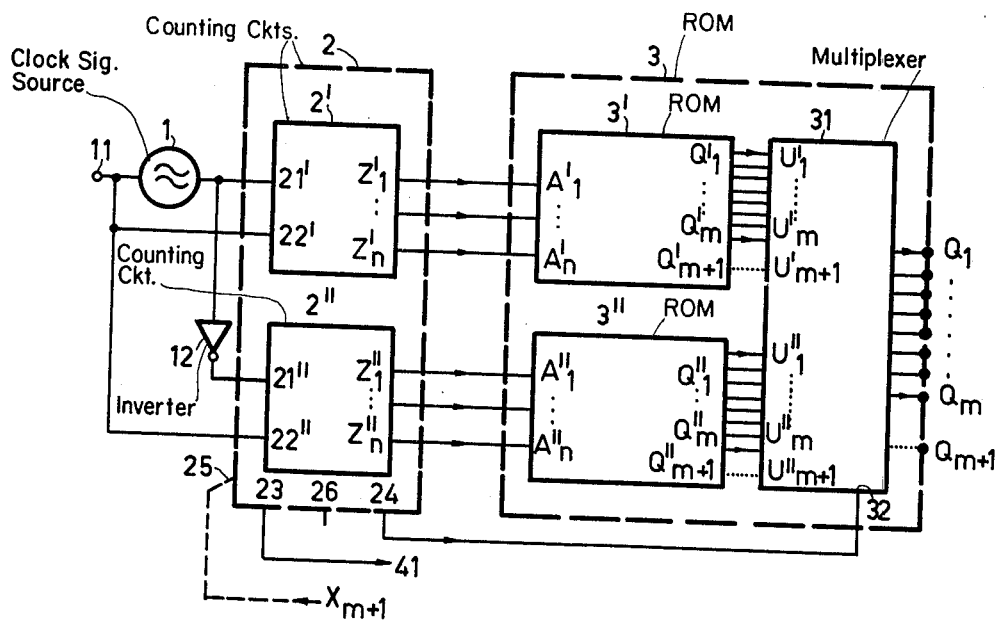
FIG. 2 shows a block diagram of a special embodiment of a signal generator having read-only memories having a relatively long access time.

When relatively slow memories 3 must be used, the maximum access time of which is greater than or equal to the synthesis clock period, a two-phase clocked circuit as shown in FIG. 2 having two counters 2' and 2" as well as two independently addressed memories 3' and 3" can be used, it being allowed for the memories 3' and 3" to have double the access time compared to the memory 3 in FIG. 1. The two counters 2' and 2" are then clocked in anti-phase with respect to 21' and 21", respectively, which is indicated by an inverter 12, arranged between them. Starting point is a regular meander shape for the output signal of the clock signal source 1, which in the circuit shown in FIG. 2 must further supply only half the output frequency, compared to FIG. 1, for as far as the information at the outputs Q1 to Qm of the memory 3 must follow one another with the same rate. From these outputs Q1 to Qm onwards, the circuit immediately following thereafter must be assumed as having been completed as shown in FIG. 1. The outputs Q1' to Qm' and Q1" to Qm" of the individual stores 3' and 3", respectively, are switched in the alternate phase from an output 24 of the counting circuit 2 to the output Q1 to Qm of the memory 3. As shown in FIG. 2, this can be done by means of a multiplexer 31 arranged behind it, a selection input 32 of which is connected to the changeover output 24 of the counting circuit 2 and inputs U' and U", respectively, of which are connected to the outputs Q' and Q", respectively, of the memory 3' and 3", respectively. Alternatively it is also possible to use separate read-only memories 3' and 3" having "Tristate"-outputs. In that case, all outputs having the same indices Q1', q1" and Q1 to Qm', Qm" and Qm are interconnected. In addition, in this case, the change-over output 24 is connected, instead of to the multiplexer input 32, directly to the "Tristate" activation input of a read-only memory, for example 3', and via an inverter to the other memory, for example 3", the multiplexer 31 then being omitted.

Optionally, with the signal generators shown in FIGS. 1 and 2, an additional $(m+1)^{th}$ bit can be provided at an output $Q_{m+1}$ of the read-only memory 3, which, like the other m bits of the information words, is stored in the buffer store 4 via $D_{m+1}$ and which is applied to a control input 25 of the counting circuit 2 via a signal line, which is indicated by means of dashed lines. Here, this bit causes—for a corresponding programming—a slowing down of the address switch-through speed. In this manner it is possible to avoid redundancies in the m bits of the memory 3, namely for output signal portions having an amplitude which remains constant (see, for example, the peak of the wide white pulse and the steps of the test line signals as shown in FIGS. 6a and 6b, respectively). For the duration of such output signal portions, it is then no longer necessary to program a large number of unchanging information words next to one another in the store 3, rather, relative to the slowing down in addressing, which is switchable by means of input 25, considerably fewer information words need be provided. However, this necessitates a 1 bit wider, but considerably "shorter", read-only memory.

Figure 3:
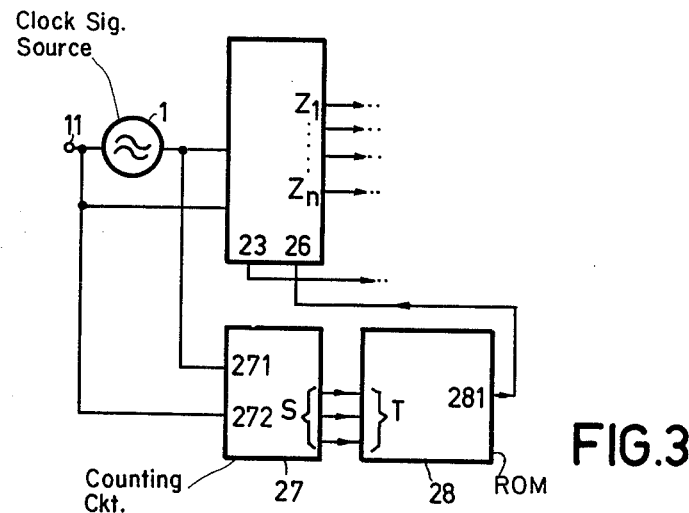
FIG. 3 shows a block diagram of a counting circuit, to be used with the signal generator shown in FIG. 1 or FIG. 2, for controlling a read-only memory which is programmed with a decreased redundancy.

A further possibility to avoid redundancy owing to signal portions having an amplitude which remains constant, consists in the provision of a programmed start-stop function of the counting circuit 2, instead of slowing down the addressing. In this case only one memory word in the read-only memory 3 is then necessary for an output signal portion having an amplitude which remains constant, independent of its length, at the address of which the counting circuit 2 remains for the same length of time as the unchanging output level in the digital-to-analogue converter 5 must be generated. The following is necessary for the start-stop function of the counting circuit 2 (FIG. 3): an additional time base counter 27, which is set to zero by the television synchronizing signal 11 via an input 272, and which is clocked by the clock pulse source 1 via an input 272, addresses address inputs T of an additional read-only memory 28 via its outputs S, this additional memory being only one bit wide. This one bit is programmed so that it indicates the portions having an output signal amplitude which remains constant. The output 281 of the additional memory 28 associated with this bit, is connected to a clock locking input 26 of the counting circuit 2. In all further respects the circuit shown in FIG. 3 corresponds to the circuit shown in FIG. 1, the components corresponding to those in FIG. 3 having been omitted.

For a future generation of test line signals, already aimed at in the studio, it is desirable to introduce the test line signals as much as possible at the beginning of the transmission circuit in order to detect measure and, possibly, automatically correct distortions. For this reason, the color encoder is to be included in this portion of the transmission circuit to be supervised. The circuit of the color encoder, with additional signals, required for this purpose, is shown in FIG. 4, the main signal inputs of the color encoder 7 not being shown for simplicity. The luminance signal component 71 is applied to the color encoder 7 via an additional input Y and passed on to an adder stage 75 already present, which passes this component on to an output 74 of the color encoder 7. The schematic variation, shown in FIG. 4, of the luminance signal component 71 holds for the test line signal shown in FIG. 6a. In order to superimpose the color difference signal component 77 of this test line signal (FIG. 6a) on the luminance component 71, the color difference signal component 77 is generated in a U-modulator 76 of the encoder 7 and is added to the output signal by means of the adding stage 75, in response to which the definite signal variation 73 is obtained. To this end another signal component, namely the modulation signal 72, is applied to another input U of the U-modulator 76.

Figure 5:
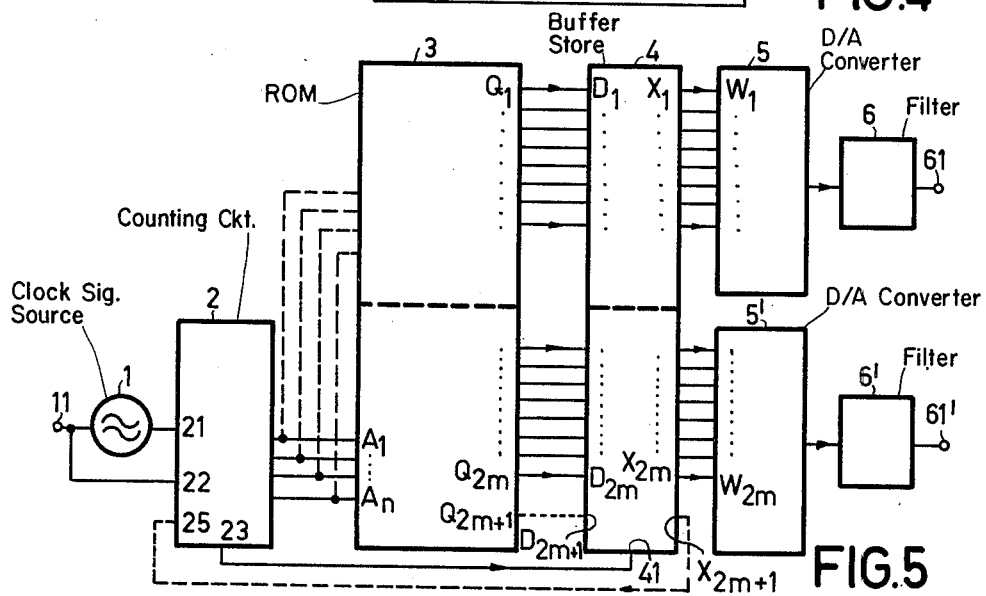
FIG. 5 shows a block diagram of an embodiment of a signal generator according to the invention which is particularly suitable for controlling the color encoder shown in FIG. 4, and FIGS. 6a and 6b show the time variation of two internationally customary test line signals for the television lines nos. 17 and 330.

Alternatively, the color encoder 7 can be fed via three additional inputs with three color components 77 of a test line signal in order to obtain the desired test line signal at the output. A signal generator which must generate several, for example, two time-coherent signal components in parallel, is in any case required for feeding the color encoder 7. FIG. 5 shows an embodiment of such a signal generator. In additional to the clock signal source 1 and the counting circuit 2, which are in conformity with the explanation given so far, a read-only memory 3 having a first section with a width of 2 m bits and a second section with a width of 2 m + 1 bits, and a buffer store 4 are provided. Each group of m-bits leads to a digital-to-analogue converter 5 and 5', respectively, a filter 6 and 6', respectively, having been arranged behind each converter 5 and 5', the two signal components being available at the outputs 61 and 61', respectively, of these filters 5 and 6'. FIG. 5 shows also a possible additional $(2m+1)^{th}$ bit for slowing down the addressing. The output 61 can, for example, supply the signal 71 and the output 61' the signal 72, as shown in FIG. 4.

It may be advantageous to use another concept of the filter for the rather narrow-band modulation signal 72 than for the luminance signal component 71. The fact that in an encoder 7 there are different signal propagation times between different inputs U and Y and the output 74, which are intensified by a different concept of the filter 6 and 6', respectively, is in no way disturbing in the signal generator according to the invention as the propagation time can be adapted in any desired manner by shifting the information in one half of the widened memory 3.

Whereas the above-mentioned simultaneous, parallel generation of several coherent signals is described, the other case in which a signal generator supplies different signals along the time axis is also very interesting. For that case a signal generator according to the invention provides a particular advantage, as a switch-over from one output signal to any other output signal can be effected in a purely digital manner by choosing different storage ranges of the memory 3. For example, a generator having a memory 3 of double the capacity can generate the signal shown in FIG. 6a in the first raster in the line "17" and the signal, shown in FIG. 6b in the second raster in the line "330", provided a meander signal having the picture frequency is applied to the additional memory range-selection bit. Of course any other type of a more elaborate time-division multiplex function is possible, a correspondingly enlarged read-only memory enabling the use of one signal generator for generating a large plurality of signal shapes, which can be chosen rapidly.

What is claimed is:

1. A signal generator for synthesizing television test line signal variations having a relatively high frequency and being composed of individual portions, said signal generator comprising (a) a combination of digital read-only memory means, counting circuit means coupled to the address input of said memory means, a clock signal generator for controlling said counting circuit means, a digital-to-analogue converter coupled to the output of said memory means, and a filter coupled to the output of the converter, the phase of the clock signal generator and of the counting circuit means being synchronized by a television synchronizing signal;

(b) a digital buffer store provided between the digital read-only memory means and the digital-to-analogue converter and having a clock input to which a signal derived from the counting circuit means is applied; whereby (c) the digital read-only memory means is programmed with a sequence of information words so that distortion on the basis of the transfer properties of the digital-to-analogue converter and of the filter provided behind the converter, respectively, are compensated for.

2. A signal generator as claimed in claim 1, wherein said digital read-only memory means comprises two read-only memories and a multiplexer coupled to the outputs of the two memories, and said counting circuit means comprises two counters coupled respectively to said two memories, characterized in that one of said memories contains the information words which are stored in the addresses having an even number, and the other of said memories contains the information words stored in addresses having an odd number, wherein the two memories are alternately addressed and read by said two counters and wherein the outputs of said two memories are alternately switched to said buffer store, by said multiplexer.

3. A signal generator as claimed in claim 1 or 2, for synthesizing signal variations which also comprise portions having an unchanging amplitude, characterized in that in the read-only memory means output signal portions having an amplitude which remains constant are denoted by a bit (m+1) present in each information word, the output signal comprising this bit being applied to a control input of the counting circuit means for changing the address switch-through speed.

4. A signal generator as claimed in claim 1 or 2 for synthesizing signal variations which also comprise portions having an amplitude which remains constant, characterized in that an additional time-base counter is provided which is clocked by the clock generator and the phase of which is synchronized by the television synchronizing signal and which addresses and additional read-only memory, wherein the portions having an amplitude which remains constant are programmed and the output of which is connected to a clock-locking input of the counting circuit.

5. A signal generator as claimed in claim 4, characterized in that separate read-only memories are provided for the individual test line signal portions, which are all selected via the counting circuit in the form of time portions.

6. A signal generator as claimed in claim 5, characterized in that for a plurality of color encoding inputs an equal number of digital-to-analogue converters and filters is provided, which are all clocked by said clock signal source and said counting circuit means via an enlarged common read-only memory and an enlarged common buffer store.

* * * * *